United States Patent Office 3,284,416
Patented Nov. 8, 1966

3,284,416
POLYMERIC FAT ACID BASED
POLYAMIDEUREAS
Marwan R. Kamal, Minneapolis, Minn., assignor to General Mills, Inc., a corporation of Delaware
No Drawing. Continuation of application Ser. No. 250,217, Jan. 9, 1963. This application Feb 1, 1966, Ser. No. 523,957
8 Claims. (Cl. 260—77.5)

The present application is a continuation of my prior application Serial No. 250,217, filed January 9, 1963, now abandoned.

This invention relates to new polyamideureas. More particularly, it relates to such polyamideureas prepared from polyamides having terminal amine groups and polyisocyanates or polythioisocyanates.

It is an object of the present invention to provide new polyamideureas.

Another object of my invention is to provide polyamideureas from organic polyisocyanates or polythioisocyanates and polyamines derived from polymeric fat acids and amino acids.

These and other objects will become apparent from the following detailed description.

The polyamideureas of the present invention are prepared by condensing a polyamine derived from polymeric fat acids and amino acids and an organic polyisocyanate or polythioisocyanate. The polyamines have the following idealized structural formula:

where R is the hydrocarbon group of polymeric fat acids, R' is a hydrocarbon group containing from about 1 to about 20 carbon atoms, y is an integer having an average value of from about 1 to about 40 and x is an integer of 2 to about 4. R is preferably a dimeric fat radical and x is preferably 2. R' may be aliphatic, alicyclic or aromatic and such radicals may contain substituent groups which do not interfere with the preparation of the polyamines. R' is preferably an aliphatic hydrocarbon group.

The polyamine reactants are prepared by reacting an amino acid with a polyamine derived from a polymeric fat acid. The latter polyamines can be prepared from a wide variety of polymeric fat acids. The term "polymeric fat acid" as used herein refers to naturally occurring and synthetic monobasic aliphatic acids having hydrocarbon chains of about 8-24 carbon atoms. The term "fat acids," therefore, includes saturated, ethylenically unsaturated and acetylenically unsaturated acids. These acids are generally polymerized by somewhat different techniques, but because of the functional similarity of the polymerization products, they are generally referred to as "polymeric fat acids." The polymeric fat acids usually contain a predominant portion of dimerized fat acids, a smaller quantity of trimerized and higher polymeric fat acids and some residual monomers.

Saturated fat acids are difficult to polymerize, but polymerization can be obtained at elevated temperatures with a peroxidic reagent such as di-t-butyl peroxide. Because of the low yields of polymeric products, these materials are not commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable agents for the polymerization include acid or alkaline clays, di-t-butyl peroxide, boron trifluoride and other Lewis acids, anthraquinone, sulfur dioxide and the like. Suitable monomers include the branched and straight chain, poly- and mono-ethylenically unsaturated acids such as 3-octenoic acid, 11-dodecenioc acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

Acetylenically unsaturated acids, such as isanic and isanolic acids, can also be polymerized to give polymeric acids which can be used. The acetylenically unsaturated acids occur only rarely in nature and are expensive to synthesize. Therefore, they are not currently of commercial significance.

Although any one of the above-described saturated, ethylenically unsaturated and acetylenically unsaturated fat acids may be used to prepare the polymeric fat acids, it is generally the practice in the art to polymerize mixtures of acids (or the simple aliphatic alcohol esters—i.e., the methyl esters) derived from the naturally occurring drying and semi-drying oils. Suitable drying or semi-drying oils include soybean, linseed, tall, tung, perilla, oiticia, cottonseed, corn, sunflower dehydrated castor oil and the like. Also the most readily available acids are oleic and linoleic and thus are preferred starting materials for the preparation of the polymeric fat acids.

It is understood that relatively pure dimerized fat acids, trimerized fat acids, and higher polymers of fat acids can be used as well as mixtures thereof. Relatively pure dimerized fat acids, for example, can be obtained from mixtures of the polymeric fat acids by high vacuum distillation or solvent extraction.

The polyamines to be reacted with the amino acids are prepared from the polymeric fat acids by converting the polymeric fat acids to the corresponding polynitriles and then hydrogenating the nitriles to form the polyamines. The polynitriles are formed by reacting the polymeric fat acids with ammonia under nitrile forming conditions. The details of this reaction are set forth in Chapter 2 of "Fatty Acids and Their Derivatives" by A. W. Ralston, John Wiley & Sons, Inc., New York (1948). The polyamines are prepared by hydrogenating the polynitriles in the presence of ammonia and a catalyst such as Raney nickel. The preparation of the polyamines can be illustrated by the following equations (using a dimerized fat acid as an example):

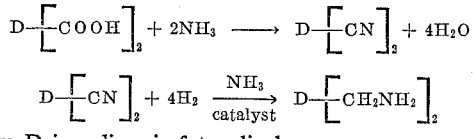

where D is a dimeric fat radical.

Where a relatively pure dimer amine is desired, for example, a dimerized fat acid may be used as the starting material. Also, the corresponding polynitrile and/or polyamine may be distilled to provide the relatively pure dimer diamine.

A wide variety of amino acids can be used in the preparation of the polyamine reactants. Representative of such compounds are 6-aminocaproic acid, 7-aminoheptanoic acid, 8-aminooctanoic acid, 10-aminodecanoic acid, 11-aminoundecanoic acid, 9-aminostearic acid, 12-aminostearic acid, 14-aminobehenic acid, p-aminobenzoic acid, p-aminocyclohexanoic acid, norcamphaneaminocarboxylic acids and the like. The simple alkyl esters of such acids may be used—i.e., butyl 7-aminoheptanoate, for example. The corresponding cyclic lactams of the aliphatic amino acids can also be used. Preferably, the amino acid reactant contains from about 4 to about 20 carbon atoms. Mixtures of the various amino acid reactants can also be used.

The polyamine reactants are prepared by heating the amino acid compound and the polyamine derived from polymeric fat acids under amide forming conditions. Reaction temperatures of about 150° to 300° C. are particularly suitable. It may be desirable to employ a low temperature initially (i.e. 150° C.), such that the reaction can be readily controlled, and then raise the temperature at a later stage to facilitate substantial completion of the reaction. The reaction may also be carried out in the presence of a diluent or solvent. Suitable solvents include phenol, cresols, thymol, and diphenyl oxide. After the completion of the reaction, the solvent can be removed such as by evaporation or distillation. The ratios of the reactants will vary according to the particular product desired. For example, where a polyamine reactant of the above-defined formula wherein $y$ is 20 is desired, at least 20 moles of amino acid will be used for each of the amine groups of 1 mole of the polyamine derived from the polymeric fat acid. It is preferred to employ a slight excess of the amino acid over that required to produce the desired polyamine. After completion of the reaction, the excess amino acid and any remaining water can be vacuum distilled from the polyamine.

The following example serves to illustrate the preparation of the polyamine reactant.

*Example A*

Into a glass reaction vessel equipped with a stirrer, thermocouple and distillation head were charged 216 g. 6-aminocaproic acid and 204 g. distilled dimer amine. The dimer amine was derived from a dimerized fat acid prepared from the mixture of acids in tall oil. The dimerized fat acid consisted essentially of a mixture of dimerized linoleic and oleic acids. The dimer amine had the following properties: wt. percent dimer—98; and amine eq. wt.—273. The reaction mixture was heated at 220° C. with stirring 3.8 hours under a nitrogen atmosphere. Vacuum was then applied for 1 hour at 250° C. to remove excess 6-aminocaproic acid in the form of caprolactam (16.8 g.). There was obtained a diamine having the formula:

where D is the dimeric fat radical derived from the dimerized fat acid. The diamine had a melting point (PMT) of 69° C., Amine Eq. Wt. of 528 and an inherent viscosity of 0.12 in m-cresol (1% by wt., 30° C.).

The preparation of the polyamine reactants is further described in the copending application of Edgar R. Rogier entitled "Polyamine Derivatives of Polymeric Fat Acids," Serial No. 250,223, filed January 9, 1963, now U.S. Patent No. 3,239,546. The disclosure of said application is incorporated herein by reference.

A wide variety of polyisocyanates may be used in the preparation of the polyamideureas of the present invention. Representative of such polyisocyanates are: methylene bis-(4-phenyl isocyanate), toluene-2,4-diisocyanate, toluene-2,6-diisocyanate, 1,5-naphthalene diisocyanate, p-phenylene diisocyanate, 3,3'-dimethyl-4,4'-diphenylmethane diisocyanate, 4,4'-diphenyl-isopropylidine diisocyanate, 3,3'-dimethyl-4,4'-diphenyl diisocyanate, hexamethylene diisocyanate, ethylene diisocyanate, butylene diisocyanate, cyclopentylene-1,3-diisocyanate, cyclohexylene-1,4-diisocyanate, and the like. Corresponding polythioisocyanates can also be employed. A particularly preferred polyisocyanate is derived from polymeric fat acids and has the following idealized, structural formula:

$$[R \text{\textendash} (CH_2)_y NCO]_x$$

where $y$ is 0 or 1, $x$ is an integer of 2 to about 4 and R is the hydrocarbon group of polymeric fat acids. The polymeric fat acid starting materials are prepared by polymerizing fat acids (saturated, ethylenically unsaturated, or acetylenically unsaturated) of 8 to 24 carbon atoms. The polyisocyanates of the above formula where $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. The polyisocyanates of the above formula wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the corresponding polycarbamyl chlorides which are then decomposed to yield the polyisocyanate. The polyisocyanates and polythioisocyanates preferably contain from 2 to about 50 carbon atoms. It is also preferred to employ diisocyanates or dithioisocyanates. Mixtures of the described reactants may also be used.

The reaction of the polyamines derived from polymeric fat acids and amino acids and the polyisocyanate or polythioisocyanate is carried out at temperatures sufficient to form the polyamideureas. Generally, the reaction will be carried out at temperatures of about 100 to 250° C. It is also preferred to employ a solvent. Suitable solvents include m-cresol, chlorobenzene, O-dichlorobenzene, dimethylformamide and the like. Mixtures of such solvents can also be used. The solvent can be removed by distillation or by precipitating the polyamideurea in an alcohol such as methanol and then separating the precipitate from the solvent mixture.

The mole ratios of the reactants can vary widely. Where a substantially linear polyamideurea is to be prepared, approximately equimolecular amounts of a diamine and a diisocyanate are employed, for example. Generally, the mole ratio of polyamine and polyisocyanate or polythioisocyanate will be in the range of about 10:90 to 90:10. Preferably the mole ratio of reactants will be in the range of about 40:60 to 60:40.

The polyamideureas of the present invention find use as molding compounds, adhesives and the like. The molded materials have good elongation and high tensile strength. They can be used wherever such properties are desired in molded parts. Additionally they are useful as coating materials.

The invention will be better understood with respect to the following examples which illustrate certain preferred embodiments of the present invention.

*Example 1*

Into a 500 ml. 3 neck flask equipped with a condenser, a stirrer and a nitrogen inlet were placed 200 ml. distilled m-cresol and 63.36 g. (0.06 mole) of the polyamine of Example A. The flask was warmed gently and stirred until the polyamine was completely in solution. Then the nitrogen inlet was replaced with a funnel which contained 35.88 g. (0.06 mole) of a diisocyanate having the formula:

where D is a dimeric fat radical (same as in the polyamine—i.e., derived from a dimerized fat acid consisting essentially of dimerized linoleic and oleic acids). The diisocyanate was then added to the warm polyamine solution over a 15-minute period. The resulting viscous solution was heated at 175° C. for a period of six hours. It was then cooled and poured over 3500 ml. methanol in a large beaker with vigorous stirring. The solid which precipitated was filtered and dried in a vacuum oven at 100° C. for 15 hours. There was obtained 88 g. of a polyamideurea having an inherent viscosity of 0.88 in m-cresol (0.5% by wt., 30° C.—inherent viscosity measured in same way in the examples to follow). The polyamideurea was molded at 200° C. to give a flexible material with a percent elongation of 360 and a tensile strength of 3900 p.s.i. (ASTM—D—638—60T).

Example II

Example I was repeated using 29.9 g. (0.05 mole) of the same diisocyanate and 72.2 g. (0.05 mole) of a polyamine having the same general formula as the polyamine of Example A but having an amine equivalent wt. of 722 and an inherent viscosity in m-cresol of 0.16 (1%, 30° C.). The value of $y$ in the formula was 3.9. There was obtained a solid polyamideurea having an inherent viscosity of 0.39. The polyamideurea was molded at 210° C. to give a material with a 235 percent elongation and a tensile strength of 5300 p.s.i.

Example III

Example I was repeated using 29.9 g. (0.05 mole) of the same diisocyanate and 61.2 g. (0.05 mole) of a polyamine having the same general formula as the polyamine of Example A but having an amine equivalent wt. of 612 and an inherent viscosity of 0.17 in m-cresol (1%, 30° C.). The value of $y$ in the formula was 3.0. There was obtained 88 g. of a solid polyamideurea. The polyamideurea was molded at 200° C. to give a material with a percent elongation of 240 and a tensile strength of 4300 p.s.i.

Example IV

Example I was repeated using 29.9 g. (0.05 mole) of the same diisocyanate and 82.3 g. (0.05 mole) of a polyamine having the formula:

D$[$CH$_2$NH(COR'NH)$_y$H$]_x$ where $x$ is 2, $y$ is 2.7, D is the dimeric fat radical (same as in the polyamine of Example A) and R' is a polymethylene radical containing 11 carbon atoms derived from 11-aminoundecanoic acid. The polyamine had an amine equivalent wt. of 823 and an inherent viscosity of 0.17 in m-cresol (1%, 30° C.). There was obtained 106 g. of a solid polyamideurea which, when molded at 185° C., gave a flexible material with a percent elongation of 255 and a tensile strength of 4900 p.s.i.

Example V

Example IV was repeated using 8.7 g. (0.05 mole) of 2,4-toluene diisocyanate and 82.3 g. (0.05 mole) of the same polyamine as used in Example IV. There was obtained 86 g. of solid polyamideurea having an inherent viscosity of 0.59. When molded at 140° C., the polyamideurea gave a material with a percent elongation of 370 and a tensile strength of 9000 p.s.i.

It is to be understood that the invention is not to be limited to the exact details of operation or the exact compositions shown or described, as obvious modifications and equivalents will be apparent to those skilled in the art and the invention is to be limited only by the scope of the appended claims.

Now, therefore, I claim:

1. A polyamideurea prepared from (1) a polyamine of the formula:

R$[$CH$_2$NH(COR'NH)$_y$H$]_x$ where R is the hydrocarbon group of polymeric fat acids, said polymeric fat acids having been prepared by polymerizing monobasic aliphatic carboxylic acids of 8 to 24 carbon atoms, R' is a divalent hydrocarbon group containing from about 1 to about 20 carbon atoms selected from the group consisting of divalent aliphatic groups, divalent aromatic groups and divalent alicyclic groups, $y$ is an integer of from about 1 to about 40 and $x$ is an integer of 2 to about 4, and (2) an organic compound selected from the group consisting of organic polyisocyanates and organic polythioisocyanates.

2. The polyamideurea of claim 1 wherein the polyamine and organic compound are used in a mole ratio of 40:60 to 60:40.

3. The polyamideurea of claim 1 wherein the polyamine and organic compound are used in substantially stoichiometric amounts.

4. The polyamideurea of claim 1 wherein R is the divalent hydrocarbon group of dimeric fat acids, said dimeric fat acids having been prepared by polymerizing monobasic aliphatic carboxylic acids of 8 to 24 carbon atoms, and $x$ is 2.

5. The polyamideurea of claim 4 wherein the organic compound is an organic diisocyanate.

6. The polyamideurea of claim 1 wherein R' is a divalent aliphatic group.

7. The polyamideurea of claim 1 wherein R' contains from about 4 to about 20 carbon atoms.

8. The polyamideurea of claim 1 wherein the organic compound is an organic polyisocyanate.

No references cited.

LEON J. BERCOVITZ, *Primary Examiner.*

M. C. JACOBS, *Assistant Examiner.*